US009791320B2

(12) United States Patent
McCreight, Jr. et al.

(10) Patent No.: US 9,791,320 B2
(45) Date of Patent: Oct. 17, 2017

(54) MOUNTING SYSTEM AND METHOD FOR NIGHT VISION TUBES

(71) Applicant: Burle Technologies, LLC, Wilmington, DE (US)

(72) Inventors: Robert Joseph McCreight, Jr., San Antonio, TX (US); James G. Burke, III, Londonderry, NH (US)

(73) Assignee: Burle Technologies, LLC, Wilmington, DE (US)

( * ) Notice: Subject to any disclaimer, the term of this patent is extended or adjusted under 35 U.S.C. 154(b) by 0 days.

(21) Appl. No.: 15/260,674

(22) Filed: Sep. 9, 2016

(65) Prior Publication Data

US 2017/0074726 A1    Mar. 16, 2017

Related U.S. Application Data

(60) Provisional application No. 62/217,313, filed on Sep. 11, 2015.

(51) Int. Cl.
| | |
|---|---|
| *G01J 5/04* | (2006.01) |
| *G01J 5/02* | (2006.01) |
| *F41G 1/32* | (2006.01) |
| *G02B 23/12* | (2006.01) |
| *G02B 23/16* | (2006.01) |
| *H01J 31/50* | (2006.01) |

(52) U.S. Cl.
CPC ............ *G01J 5/04* (2013.01); *F41G 1/32* (2013.01); *G01J 5/028* (2013.01); *G02B 23/12* (2013.01); *G02B 23/16* (2013.01); *H01J 31/50* (2013.01)

(58) Field of Classification Search
CPC .................................. G01J 5/028; G01J 5/04
See application file for complete search history.

(56) References Cited

U.S. PATENT DOCUMENTS

| 4,067,045 A | 1/1978 | Provost et al. |
| 5,446,817 A | 8/1995 | Kardos et al. |

(Continued)

FOREIGN PATENT DOCUMENTS

WO    9927318 A1    6/1999

OTHER PUBLICATIONS

International Search Report and Written Opinion of the International Searching Authority, dated Dec. 7, 2015, from International Application No. PCT/US2015/039588, filed on Jul. 8, 2015. Fifteen pages.

(Continued)

*Primary Examiner* — Mark R Gaworecki
(74) *Attorney, Agent, or Firm* — HoustonHogle LLP

(57) ABSTRACT

A mounting system for night vision tubes includes a multi-part sleeve that opens in the manner of a clamshell to receive the tube. The sleeve includes a longitudinal seam or a partial longitudinal seam and opens around compliant hinge regions. The night vision tube engages a ramp section of the sleeve, urging the sleeve to open and then abuts against a front shoulder, causing the sleeve to clamp shut around the night vision tube. The tube is constrained between the front shoulder and a retaining shoulder. An indexing pin engages the night vision tube and the sleeve to maintain mutual rotational alignment. The sleeve and the tube are inserted into a housing of a night vision system.

17 Claims, 4 Drawing Sheets

(56) References Cited

U.S. PATENT DOCUMENTS

| | | | | |
|---|---|---|---|---|
| 5,943,174 A | * | 8/1999 | Bryant | G02B 23/12 |
| | | | | 250/214 VT |
| 6,288,386 B1 | * | 9/2001 | Bowen | G02B 23/12 |
| | | | | 250/214 VT |
| 7,870,688 B1 | * | 1/2011 | Dasiukevich | F41G 11/004 |
| | | | | 248/229.1 |
| 2007/0103796 A1 | * | 5/2007 | Floyd | G02B 23/12 |
| | | | | 359/811 |
| 2008/0290260 A1 | * | 11/2008 | Moody | G02B 23/12 |
| | | | | 250/214 VT |
| 2008/0297885 A1 | | 12/2008 | Pochapsky et al. | |
| 2009/0128684 A1 | * | 5/2009 | Apel | H01L 27/14618 |
| | | | | 348/360 |
| 2013/0036646 A1 | * | 2/2013 | Rubac | F41C 23/16 |
| | | | | 42/90 |
| 2016/0048001 A1 | | 2/2016 | McCreight, Jr. | |

OTHER PUBLICATIONS

International Search Report and Written Opinion of the International Searching Authority, dated Dec. 7, 2016 from International Application No. PCT/US2016/050906, filed Sep. 9, 2016. Eleven pages.

* cited by examiner

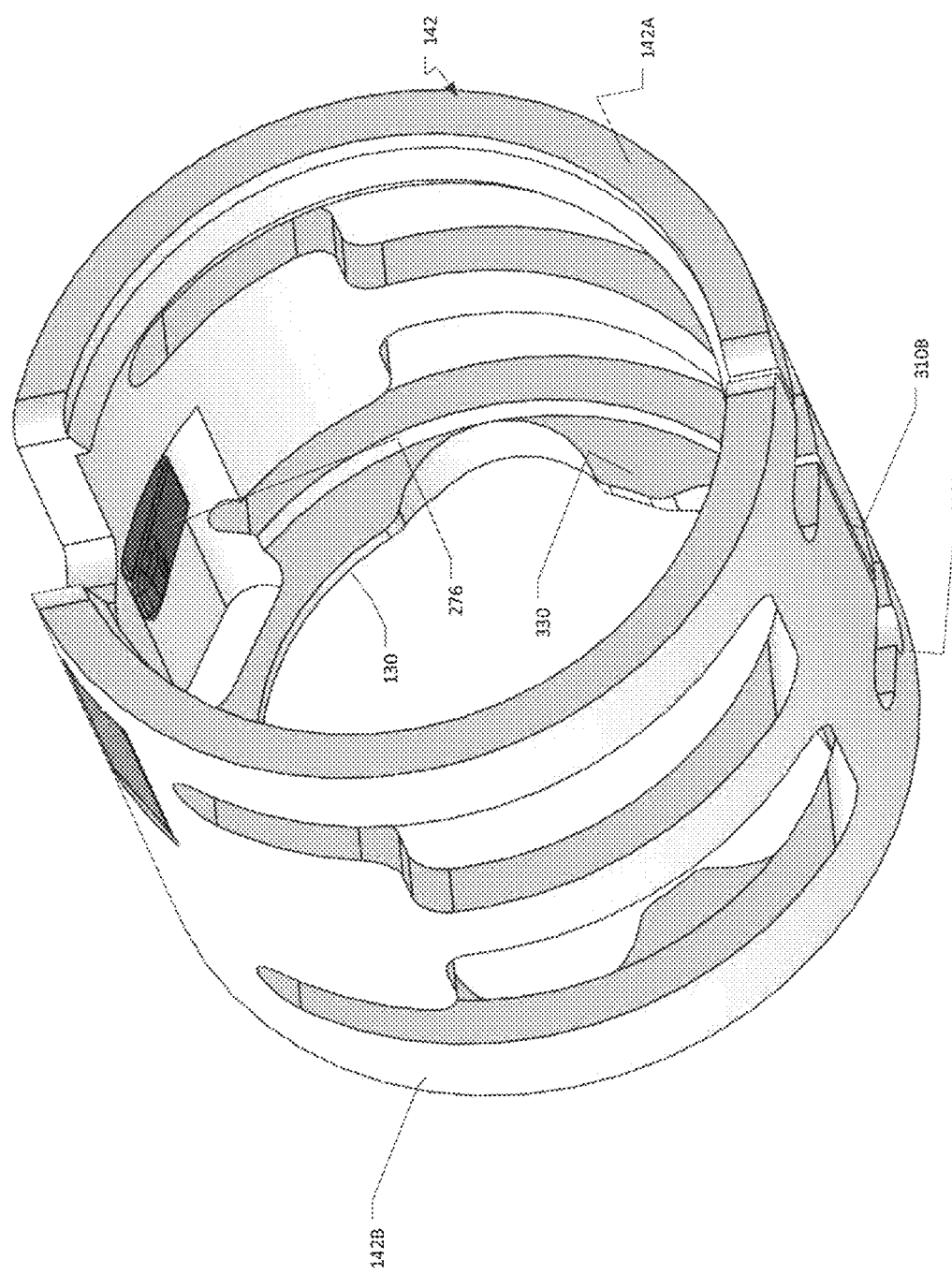

MOUNTING SYSTEM AND METHOD FOR NIGHT VISION TUBES

RELATED APPLICATIONS

This application claims the benefit under 35 USC 119(e) of U.S. Provisional Application No. 62/217,313, filed on Sep. 11, 2015, which is incorporated herein by reference in its entirety.

BACKGROUND OF THE INVENTION

Night vision systems generally comprise a number of components. A front lens system collects infrared light from the environment and provides the light to a night vision tube. The tube magnifies the number of received photons. In a typical tube, incoming light strikes a photocathode plate causing the emission of electrons through a microchannel plate. The electrons then form an image on a photocathode. An eye piece then conditions the image for the viewer. The tube is usually contained within a housing that is threaded at either end to mate with the front lens system and the eye piece.

In one such system, a resilient sleeve and a front compression buffer fabricated from plastic surround the tube within the housing. A retaining ring engages threads in the rear of the housing and is used to compress the sleeve against the front compression buffer and the housing. The sleeve can include an electronics path for connecting power from a battery pack to electrical contacts on the night vision tube. This electronics path can include electrical conductors extending between the battery pack, through routing cutouts formed in the sleeve to the electrical contacts. See U.S. Pat. Appl. Publ. No, US 2016/0048001 A1 by Robert Joseph McCreight, JR., which is incorporated herein by this reference. This system can also allow for retrofitting a smaller night vision tube into a housing designed for a larger tube.

SUMMARY OF THE INVENTION

The present system incorporates an improved sleeve that opens in the manner of a clamshell, allowing for easier insertion of the night vision tube into the sleeve. Front and rear shoulders hold the tube in place, eliminating the need for extra components (such as the rear buffer).

In general according to one aspect, the invention features a night vision system comprising a night vision tube and a sleeve for surrounding the night vision tube in a housing, wherein the sleeve has a seam that divides the sleeve into two parts.

Preferably, the seam extends longitudinally along the sleeve and only partially along the length. To receive the night vision tube, the sleeve opens in the manner of a clamshell around compliant hinge regions that attach the two parts.

In embodiments, the sleeve comprises a front compression buffer portion, a ramp section, against which the night vision tube engages to open the sleeve, a retaining shoulder and a front shoulder for constraining axial movement of the night vision tube, and an indexing pin to maintain mutual rotational alignment between the night vision tube and the sleeve.

In general according to another aspect, the invention features a method of mounting a night vision tube in a housing. The method comprises inserting the night vision tube into a multi-part sleeve for surrounding the night vision tube, closing the sleeve around the night vision tube, and inserting the sleeve with the night vision tube into the housing.

In embodiments, the method comprises the night vision tube abutting against a front shoulder, causing the sleeve to clamp shut around the night vision tube.

The above and other features of the invention including various novel details of construction and combinations of parts, and other advantages, will now be more particularly described with reference to the accompanying drawings and pointed out in any claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 4 is a perspective view of the compression sleeve with the tube removed, according to the preferred embodiment of the present invention.

DETAILED DESCRIPTION OF THE PREFERRED EMBODIMENTS

Figure 1:
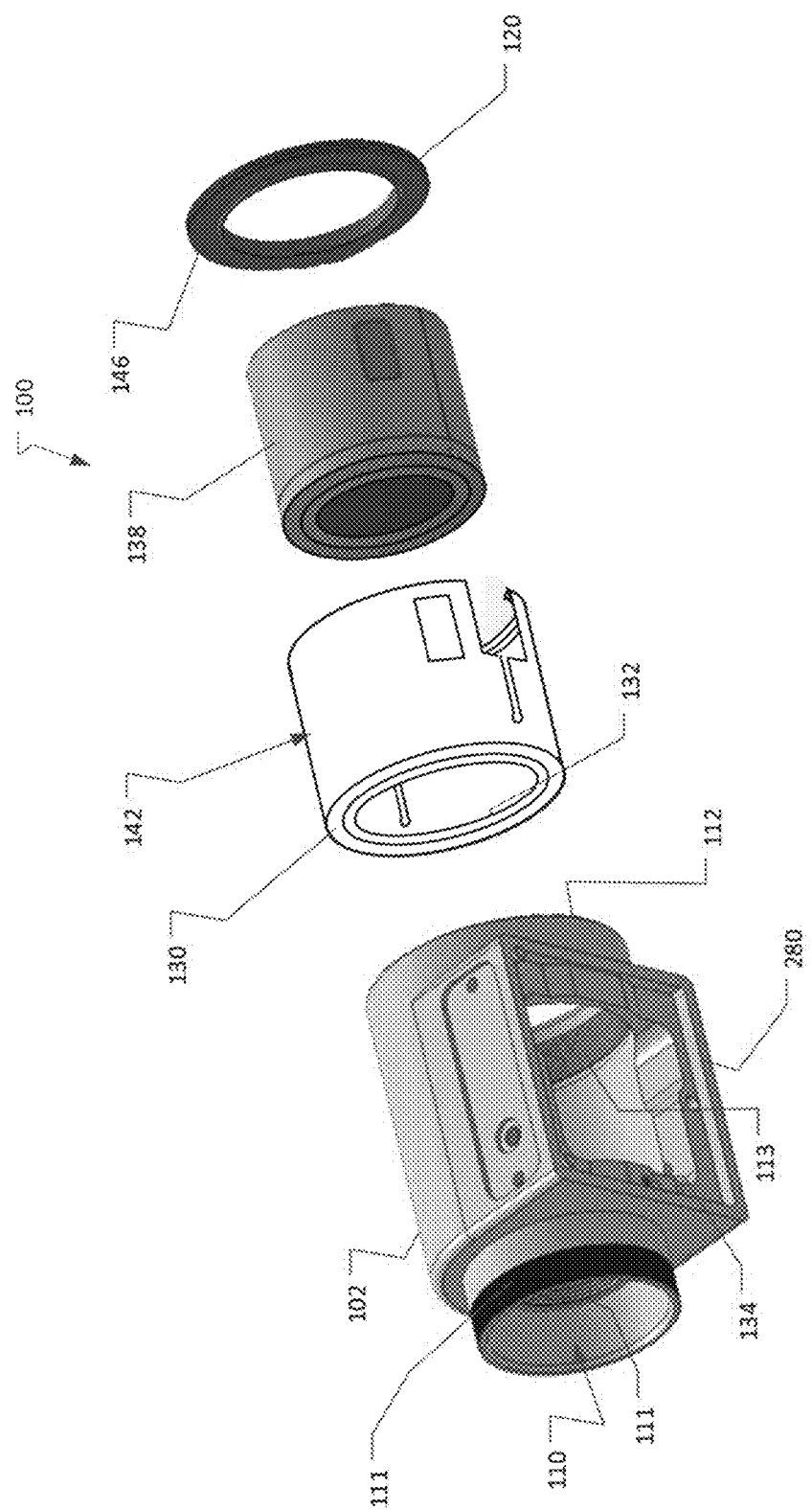
FIG. 1 illustrates a scale exploded view of a night vision system according to one embodiment of the present invention.

FIG. 1 shows one embodiment of a night vision system 100 constructed according to the principles of the present invention.

A generally cubic-shaped hyper body functions as an outer housing 102 for the night vision system 100. It has a wall section 280 to which a battery pack mounts. Along its central axis, the housing 102 has an entrance aperture 110 through which light enters the system 100. Typically this light is collected by collection optics such as a front lens system, which is attached to the entrance aperture 110 via front threads 111 formed in the housing 102.

Light is transmitted to the user's eye through an exit aperture 112, to which eyepiece optics are typically attached. The eyepiece or rear lens system mates to the housing 102 via rear threads formed in the housing 102.

Inserted through the exit aperture 112 are a series of components that are used to mount the night vision tube 138 in the housing 102.

The largely cylindrical night vision tube 138 is inserted into a hollow cylindrical compression sleeve 142. The night vision tube 138 seats against the thrust surface 132 of a front compression buffer 130, which is integral with the sleeve 142. Next, the compression sleeve 142, containing the vision tube 138, is inserted thro the exit aperture 112 and seats against a concave thrust surface within the housing 102.

A retaining ring 146 has a threaded outer peripheral surface 120 that mates with the internal rear threads 113 formed in the housing 102 in the exit aperture 112. The retaining ring 146 is used to compress the compression sleeve 142 over the night vision tube 138.

The combination of the compression buffer 130 and the compression sleeve 142 functions to sheath, isolate, and compress the night vision tube 138 in a moldable/deformable sheath.

Figure 2:
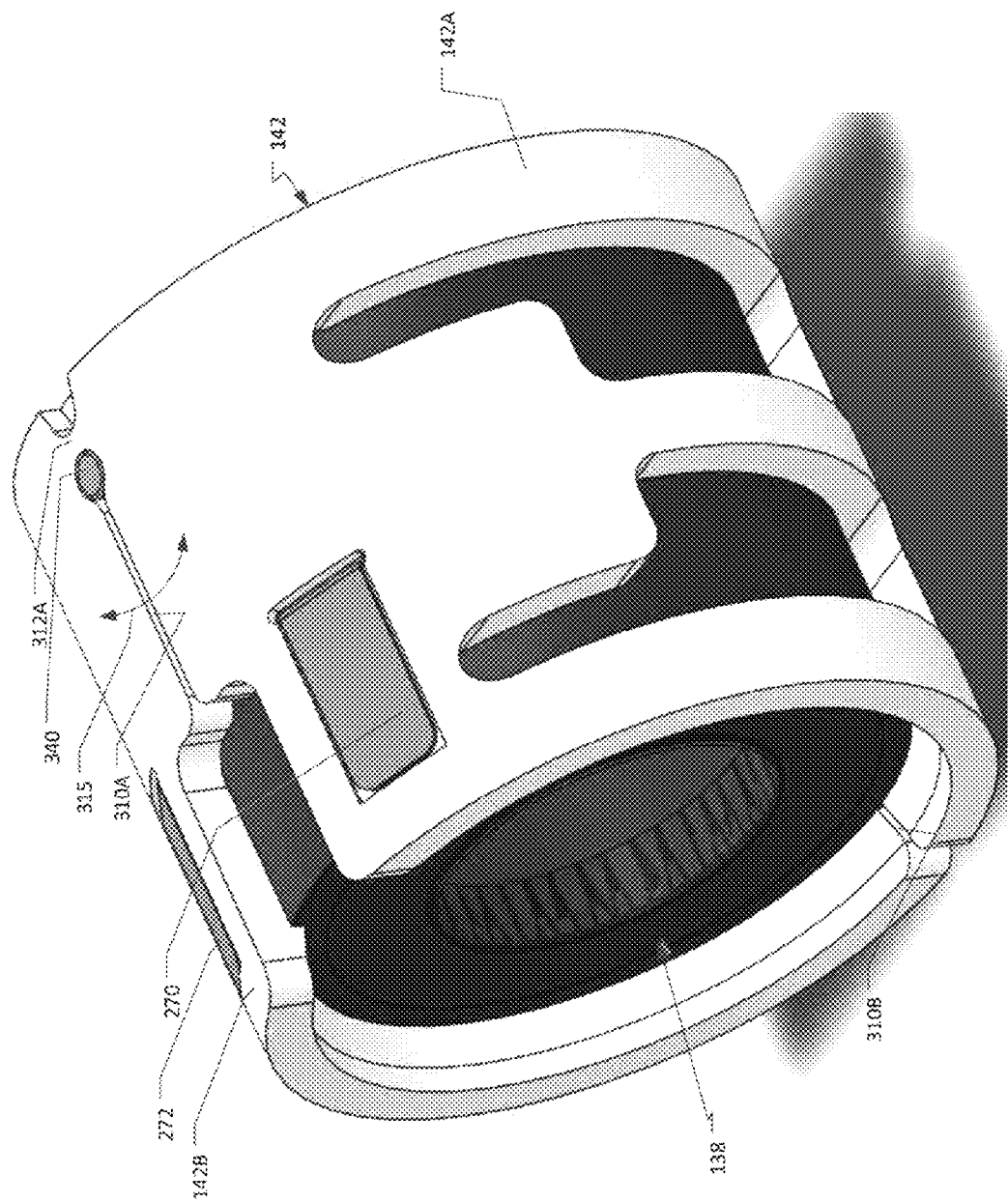
FIG. 2 is a perspective view of the compression sleeve holding a night vision tube, according to the preferred embodiment of the present invention.

FIG. 2 shows the compression sleeve according to the preferred embodiment of the present invention. The compression sleeve 142 surrounds the night vision tube 138.

The compression sleeve 142 includes a top longitudinal partial seam 310A and a bottom longitudinal partial seam 310B. These seams allow the two halves 142A and 142B of the compression sleeve 142 to pivot open as indicated by arrow 315 in the manner of a clamshell. The pivoting occurs around top and bottom compliant and resilient hinge regions 312A, 312B that are integral with the compression sleeve 142 and correspond to the regions of the sleeve located between the ends of the respective seams 310A, 310B and the front end of the sleeve 142. This pivoting allows the insertion and removal of the night vision tube 138 from the rear side of the compression sleeve 142.

Two battery connector/power tabs 270, 272 provide electrical contacts for supplying power to the night vision tube 138 through the body of the compression sleeve 142.

Additionally, the compression sleeve 142 illustrated in FIG. 2 includes volumetric, radially-extending cut outs that have been formed through the cylindrical compression sleeve. The cut out regions preferably extend all the way through the radial thickness of the compression sleeve 142, forming openings into the hollow center of the sleeve. The cut out regions extend circumferentially along the arc of the compression sleeve 142 between and perpendicular to the seams 3110A, 3110B through an arc of over 90 degrees. The longitudinal extent of the cut out regions vary such that the section of the cut out regions closest to the battery connectors 270, 272 extend a shorter distance longitudinally than the rest of the cut out regions. Each half of the compression sleeve 142A, 142B includes two cut out regions.

These cut out regions increase the compliance of the compression sleeve 142 in the radial direction.

Figure 3:
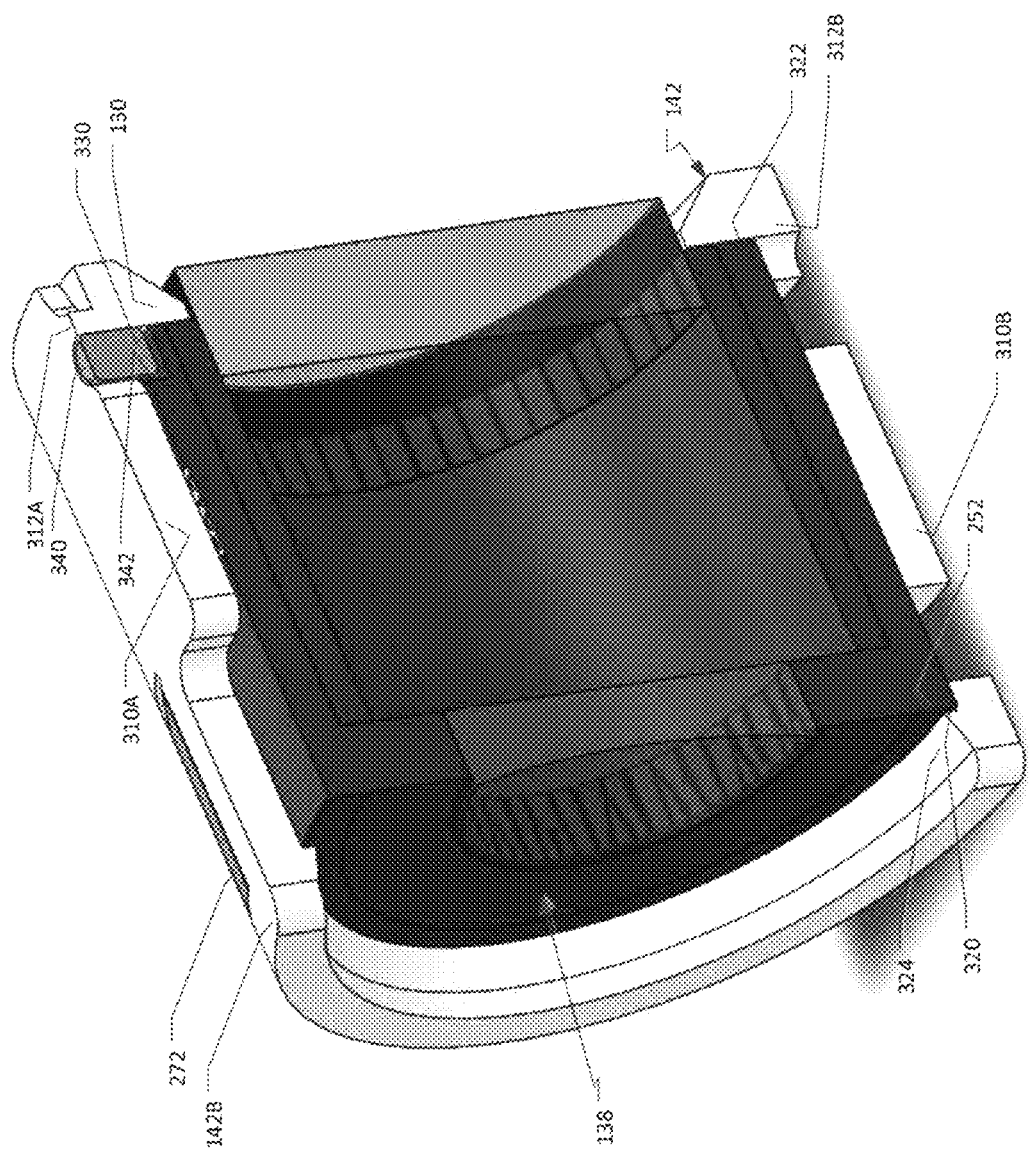
FIG. 3 is a perspective, cutaway view of the compression sleeve according to the preferred embodiment of the present invention.

As best illustrated in FIG. 3, the night vision tube 138 is retained in the compression sleeve 142 and held in the axial direction between an annular sleeve retaining shoulder 320 and the integral front compression buffer 130. When initially inserting the night vision tube 138 into the compression sleeve 142, the leading outer edge 322 of the night vision tube 138 engages a ramp section 324 at the rear portion of the compression sleeve 142. The engagement causes the two rear sections of the two halves 142A, 142B of the compression sleeve 142 to pivot open.

The night vision tube 138 then slides into the compression sleeve 142 until the leading edge 322 of the night vision tube 138 abuts against the front shoulder 330 of the integral compression buffer 130. At this point, the two halves 142A, 142B of the compression sleeve 142 clamp shut closing the top longitudinal partial seam 310A and the bottom longitudinal partial seam 310B. The sleeve retaining shoulder 320 then engages the rear shoulder 252 of the night vision tube 138 such that the night vision tube 138 is retained in the compression sleeve 142 with no longitudinal/axial movement.

Rotational alignment of the night vision tube 138 in the compression sleeve is important to maintain electrical connections between the power tabs 140 that are located on the outer wall of the tube 138 and the contact tabs 276 of the compression sleeve 142. In the illustrated embodiment, this is achieved using an indexing pin 340. In more detail, the indexing pin is inserted into a widened portion of the top longitudinal partial seam 310A. The pin seats into an indexing blind hole 342 on the outer surface of the night vision tube 138. In this way, the rotational alignment between the night vision tube 138 and the compression sleeve is enforced and maintained during operation.

After this assembly, the compression sleeve 142 with the night vision tube 138 can then be inserted into the exit aperture 112 of the housing 102 as illustrated in FIG. 1.

Finally, FIG. 4 shows some further aspects of the preferred embodiment of the compression sleeve 142 including the electronics path for connecting power from a battery pack to electrical contacts on the night vision tube 138. This electronic path can include electrical conductors extending between the battery pack to the electrical contacts. Specifically, one of the contact tabs 276 is shown, which tab makes electrical contact to the power tabs that would be located on the outer wall of the night vision tube 138. Also shown is the bottom compliant hinge region 312B and the bottom longitudinal partial seam 310B.

While this invention has been particularly shown and described with references to preferred embodiments thereof it will be understood by those skilled in the art that various changes in form and details may be made therein without departing from the scope of the invention encompassed by the appended claims.

What is claimed is:

1. A night vision system, comprising:
    a night vision tube; and
    a sleeve for surrounding the night vision tube in a housing, wherein the sleeve has a seam that divides the sleeve into two parts, wherein said seam extends partially longitudinally along the sleeve and the sleeve opens around compliant hinge regions that attach the two parts.

2. The night vision system as claimed in claim 1, wherein the sleeve opens in the manner of a clamshell to receive the night vision tube.

3. The night vision system as claimed in claim 1, wherein the sleeve comprises a ramp section, against which the night vision tube engages; causing the sleeve to open.

4. The night vision system as claimed in claim 1, wherein the sleeve comprises a retaining shoulder and a front shoulder for constraining movement of the night vision in an axial direction.

5. The night vision system as claimed in claim 1, wherein cut outs have been formed on the sleeve.

6. A method of mounting a night vision tube in a housing, the method comprising:
    inserting the night vision tube into a multi-part sleeve for surrounding the night vision tube, wherein said multi-part sleeve has a sleeve opening around compliant hinge regions that connect the two parts of the sleeve to receive the night vision tube; and
    closing the sleeve around the night vision tube and inserting the sleeve with the night vision tube into the housing.

7. The method as claimed in claim 6, further comprising the sleeve opening in the manner of a clamshell.

8. The method as claimed in claim 6, further comprising the night vision tube engaging a ramp section of the sleeve, urging the sleeve to open.

9. The method as claimed in claim 6, further comprising constraining the night vision tube in an axial direction between a retaining shoulder of the sleeve and a front shoulder.

10. The method as claimed in claim 6, wherein the night vision tube abuts against the front shoulder, causing the sleeve to clamp shut around the night vision tube.

11. The method as claimed in claim 6, wherein an indexing pin maintains rotational alignment between the night vision tube and the sleeve.

12. The method as claimed in claim 6, wherein cut outs have been formed on the sleeve.

13. A night vision system, comprising:
a night vision tube; and
a sleeve for surrounding the night vision tube in a housing, wherein the sleeve has a seam along the sleeve that divides the sleeve into two parts, wherein the sleeve opens around compliant hinge regions that attach the two parts.

14. The night vision system as claimed in claim 13, wherein the sleeve opens in the manner of a clamshell to receive the night vision tube.

15. The night vision system as claimed in claim 13, wherein the sleeve comprises a front compression buffer portion.

16. A night vision system, comprising:
a night vision tube; and
a sleeve for surrounding the night vision tube in a housing, wherein the sleeve has a seam that divides the sleeve into two parts, wherein the sleeve comprises a front compression buffer portion.

17. A night vision system, comprising:
a night vision tube;
a sleeve for surrounding the night vision tube in a housing, wherein the sleeve has a seam that divides the sleeve into two parts; and
an indexing pin that engages the night vision tube and the sleeve to maintain mutual rotational alignment.

* * * * *